Dec. 31, 1935.                L. R. NELSON                2,026,055

HOSE CONNECTER AND METHOD OF MAKING THE SAME

Filed Sept. 9, 1933

Inventor:
Lewen R. Nelson
By: Parkinson & Lane, Atty.

Patented Dec. 31, 1935

2,026,055

UNITED STATES PATENT OFFICE 2,026,055

HOSE CONNECTER AND METHOD OF MAKING THE SAME

Lewen R. Nelson, Peoria, Ill., assignor to L. R. Nelson Mfg. Co., Inc., Peoria, Ill., a corporation of Illinois Application September 9, 1933, Serial No. 688,775

5 Claims. (Cl. 113—116)

The present invention relates to hose connecters, such as those for connecting segments of a hose or a hose to a fitting.

Among the objects of the invention, are to provide a novel hose connecter and a novel method of making the same.

The connecter chosen to illustrate the invention is of the claw type comprising a tubular member to which an end of a hose or hose segment is engaged and a claw ring having its inner portion engaged with the tubular member and having a series of outwardly extending fingers or claws capable of being pounded or hammered against or into the end portion of the hose to make a prehensile engagement therewith. I have effected the engagement between the ring and the tubular part by swaging or die pressing an inner annular portion of the ring into the tubular part. The friction therebetween normally holds the parts from relative movement but to more positively assure the engagement and securement, the present invention comprehends the forming of the inner part of the claw ring with one or more projections, tongues teeth or lobes to individually engage and lock with a strained part of the tubular member, thus effecting a positive securement between the tubular member and the claw ring. In other words, the ring has an inner set or series of projections for engagement with the tubular member, corresponding more or less with the outer set or series of projections for engagement with the hose connected to the tubular member.

In a specific illustrative method for effecting the above, dies with annular tapered ends engage the projections or lobes to bend or otherwise strain them to press into and indent portions of the tubular member, the projections being locked into the indentations. If desired, the tubular member may be pressed against the projections or lobes to produce the same result or form of engagement or securement.

Another object of the invention is to produce a novel engagement between the tubular member and the hose engaging ring of such a shape, as substantially polygonal, as to prevent relative rotation of the tubular member and the ring, and having means, such as shoulders or the like, for so coacting with the projections on the ring as to prevent relative longitudinal or axial movement of the tubular member and the ring.

Other objects, advantages, capabilities, features and process steps are comprehended by the invention as will later appear and as are inherently possessed by the invention.

Referring to the drawing.

Figure 1:
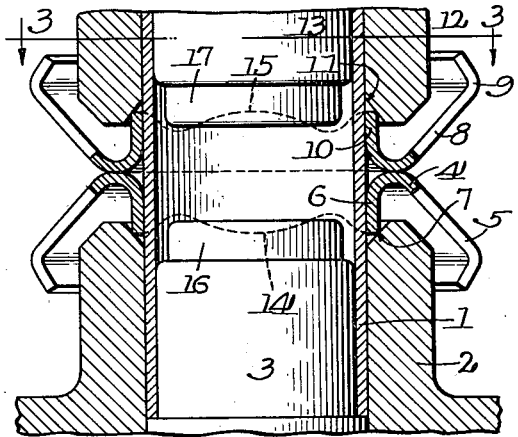
Fig. 1 is a sectional view through a die means and connecter parts, showing a stage of the process for making the connecter.

Referring more in detail to the drawing, the invention comprises using a tubular member 1 set into a recess or socket provided between a die 2 and a mandrel 3. A claw ring 4 having a series of outwardly extending fingers 5, and an inner annular flange 6, is placed over the blank 1 to surround it at the desired point, and rest with the flange 6 on a bevel 7 of the die 1. A second claw ring 8 having a series of outwardly extending fingers 9 and an inner annular flange 10 is placed over the blank 1 to surround it at the desired point and rest upon the previously positioned ring, and to present its flange 10 for engagement with a bevel 11 of a die 12. The upper end of the blank 1 extends into a recess or socket provided between the die 12 and a mandrel 13.

The edges of the annular flanges 6 and 10 are provided with projecting or jutting portions 14 and 15 which may be of any desired form and which are shown in the specific embodiment selected to illustrate the invention, in the form of lobes, teeth or scallops. These lobes are the parts which contact with the bevels 7 and 11 of the annular dies 2 and 12, and are the parts which lock with the tube 1 by the action of the dies. The mandrels 3 and 13 are circular in cross-section and comprise circular extensions 16 and 17 respectively, of lesser diameter than the body portions of the mandrels, thus providing abutment means for the strained or indented parts of the tube 1 as later explained.

Figure 2:
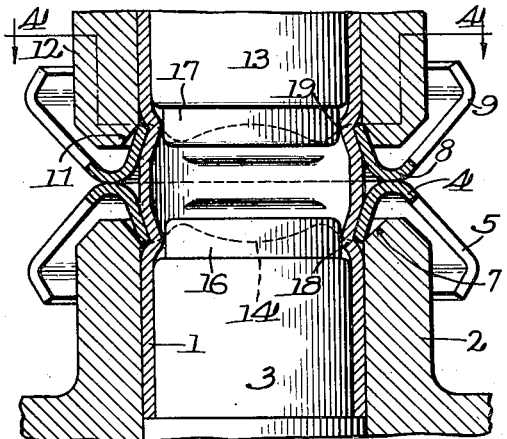
Fig. 2 is a similar view showing another stage of operation.
Figure 3:
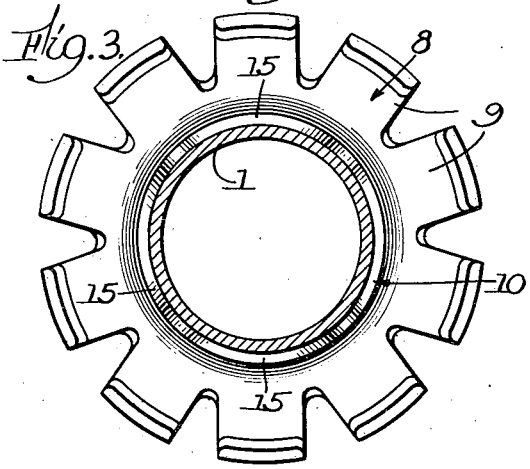
Fig. 3 is a transverse sectional view taken in a plane represented by line 3—3 in Fig. 1, but omitting showing the die in section.
Figure 4:
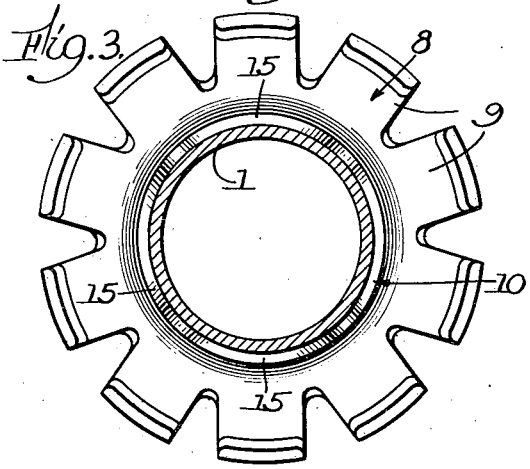
Fig. 4 is a similar view to Fig. 3 but taken in planes represented by line 4—4 in Fig. 2.

In operation, the dies and the mandrels move toward each other, or one toward the other, so that the annular die bevels 7 and 11 inwardly press or force the lobes 14 and 15 against and into the adjacent wall portions of the tube 1 to produce strained portions or indentations 18 and 19 as shown in Fig. 2, which indentations are backed by the mandrel extensions 16 and 17 substantially as the ends of the lobes reach the bottoms of the bevels 7 and 11. See Fig. 2. Fig. 3 shows the tube (in section) and the ring flange and lobes before the operation of the die, and Fig. 4 shows the same after the die has strained the tube and lobes.

Figure 5:
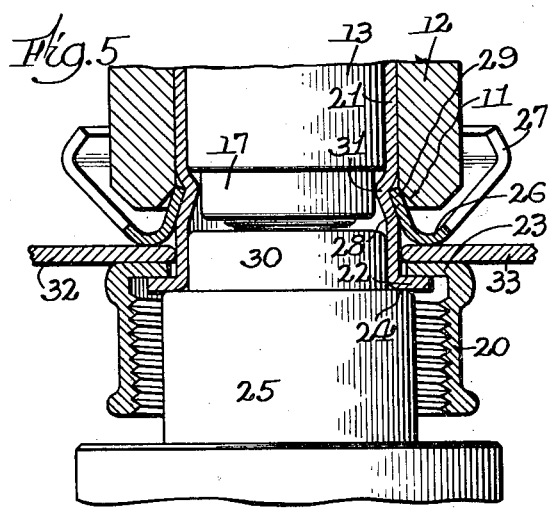
Fig. 5 is a view similar to Fig. 2 and showing the invention applied to a connecter for connecting a hose to a fitting.

Fig. 5 is similar to Fig. 2 showing the engagement of but one claw ring on the tube, one end of the tube being connected to a fitting such as a union coupling 20 suitably threaded to fit the male part of the coupling or to be secured to the threaded end of a faucet, or the like. An end of the tube 21 has a flange 22 rotatably received within the coupling in engagement with the flange 23 of the coupling member 20.

In operation, the tube is seated upon a shoulder 24 of an anvil 25 or the like, and extends into a recess or socket provided between the die 12 and the mandrel 13. Before the die is brought into place, a claw ring 26 is passed over and surrounds the tube at the desired point. This ring has a series of outwardly extending fingers 27 adapted to be pounded or hammered into contact or engagement with an end portion of a hose segment, and has an inner annular flange 28 provided with one or more projections, tongues, teeth or lobes 29 adapted to engage with the tube 21, thus forming a toothed edge portion on the part 28. The anvil 25 has an extension 30 adapted to fit into the lower end of the tube or blank, while the mandrel extension 17 acts to back or act as an abutment for the strained or indented portion of the tube 21.

With the parts in place as mentioned, the die 12 moves toward the anvil 25, and its bevel 11 acts against the lobe or lobes 29 to press and force the same into the side wall of the tube 21 to produce a strained or indented portion 31 stopping against the mandrel extension 17 as shown in Fig. 5. As the die presses also axially against the ring 26, the latter is backed by suitable supporting members 32 and 33 which may move into place between the ring 26 and the flange 23 of the coupling member 20 prior to the action of the die and anvil. By interposing these supporting members 32 and 33 during the movement of the die 12, not only sufficient support is furnished for the claw ring 26 during the action of the die, but also acts to so hold the ring 26 in place to enable a forcing of the lobes or tongues into indentations in the tube far enough to hold the ring firmly against the axial pressure of the die as also against the axial pressure imposed on the ring when the hose end is attached or connected to the coupling. In other words, the indentations are so formed that the lobes, teeth or tongues therein, will not move axially and be wedged out of the indentations either under the force of the die or the force of the hose end when being attached. The forms or shapes of the tube and the lobes before and after the operation of the die and mandrel, are shown in Figs. 3 and 4.

Figure 6:
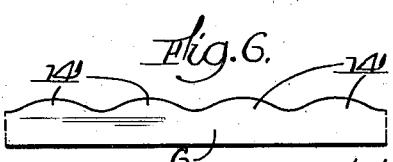
Fig. 6 is a developed or rolled out view of the inner part of a claw ring, showing the projections or tongues or lobes; and, Fig. 7 is a side view of a connecter constructed in accordance with the invention.

Fig. 6 is an unrolled or developed plan of the annular flange 6 or 10 or 28 as the case might be, of the claw ring (omitting the showing of the claws) and showing the forms of the lobes or projections 14 or 15 or 29 as the case might be.

Figure 7:
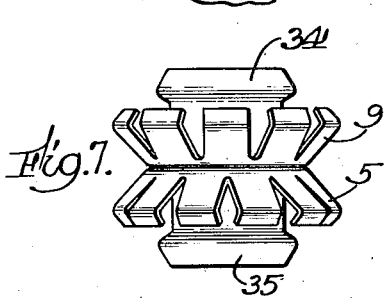

Fig. 7 shows a completed connecter ready for attachment of hose segments. The ends of the tube are upset or rolled to form heads 34 and 35 over which the end portions of the hose segments may be engaged, after which the fingers 9 and 5 may be hammered down to engage them with the outer side of the end portions of the hose segments.

By engaging projections or lobes into the tube wall at one or more points, the rings are prevented from turning on the tube, the ends of the lobes being fixed or locked in the indentations formed in the side wall of the tube. Likewise, since each indentation has a shoulder at the end of the lobe, longitudinal or axial movement of the claw ring on the tube is also prevented. Moreover, when placing the rings on the tube prior to the die operation, it is not necessary to angularly relate the ring to the tube nor one ring with reference to another, thus avoiding any operation of turning the ring to any given angular relation on the tube or with respect to any other rings. The terms, lobes, scallops, tongues and teeth, are not used herein in a limited sense but are generic to any shape or form desired.

While I have herein disclosed a few embodiments of the invention and a method of making the same, it is to be understood that the invention is not limited thereto but comprehends other constructions, details, arrangements of parts, features and process steps without departing from the spirit of the invention.

Having thus disclosed the invention, I claim:

1. A method of making hose connectors comprising the step of engaging a series of jutting portions which constitute a toothed edge on an annular embracing part of a hose engaging member with strained portions of a tubular blank to form such an engagement therebetween as to prevent relative movement of the blank and member, and so supporting the hose engaging member while engaging the jutting portions thereof with the blank as to prevent relative movement of the blank and member during the engaging of the jutting portions of said member with the blank.

2. A method of making hose connecters comprising the step of engaging a series of jutting portions which constitute a toothed edge on an annular embracing part of a hose engaging member with a strained portion of a tubular blank beyond the embracing part to form such an engagement therebetween as to prevent relative movement of the blank and member.

3. A hose connecter comprising a tubular member, and a hose connecting member having an annular part embracing said tubular member, and a series of projections extending from said annular member and constituting a toothed edge on said embracing part and extending into strained portions of said tubular member for locking said members together against relative movement thereof.

4. A hose connecter comprising a tubular member, a connecting member comprising an annular part embracing said tubular member and having a series of lobes extending from said annular part to constitute a toothed edge on the annular embracing part, said lobes being in engagement with strained portions of said tubular member to prevent relative movement of said members.

5. A hose connecter comprising a tubular member, and a hose connecting member having an annular part embracing said tubular member and provided with a series of projections extending beyond said annular part to constitute a toothed edge on the annular embracing part, said projections extending into strained portions of said tubular member beyond the embracing part thereof for locking said members together against relative movement thereof.

LEWEN R. NELSON.